UNITED STATES PATENT OFFICE.

ARTHUR GEORGE GREEN AND THOMAS ATKINSON LAWSON, OF LONDON, ENGLAND, ASSIGNORS TO BROOKE, SIMPSON & SPILLER, LIMITED, OF SAME PLACE.

RED AZO DYE.

SPECIFICATION forming part of Letters Patent No. 500,761, dated July 4, 1893.

Application filed July 12, 1892. Serial No. 439,817. (Specimens.) Patented in England September 10, 1889, No. 14,304.

*To all whom it may concern:*

Be it known that we, ARTHUR GEORGE GREEN and THOMAS ATKINSON LAWSON, chemists to the firm of Brooke, Simpson & Spiller, Limited, of London, England, aniline-dye manufacturers, subjects of the Queen of Great Britain and Ireland, residing at Atlas Works, Hackney Wick, London, in the county of Middlesex, England, have invented certain new and useful Improvements in the production of Azo Coloring-Matters, (for which we have obtained a patent in Great Britain, No. 14,304, bearing date September 10, 1889,) of which the following is a specification.

Our invention relates to the preparation of azo-colors of various shades of yellow, orange, and red, most of which have a decided substantive affinity for cotton. These colors are obtained by combining any of the known phenols, or amines, or their sulfonic or carboxylic acids (such as are capable of combining with diazo compounds in general) with the tetrazo compounds, of either of the two following bases: para-azoxy-ortho-toluidin [1:2:4] $C_6H_3(CH_3)(NH_2).N_2O.C_6H_3(NH_2)(CH_3)$ [4:2:1], which melts at about 168° centigrade; para-azo-ortho-toluidin [1:2:4] $C_6H_3(CH_3)(NH_2)N_2.C_6H_3(NH_2)(CH_3)$ [4:2:1], which melts at about 197° centigrade. These bases were described by Limpricht in 1885 (see *Berichte of the German Chemical Society*, 18, page 1403) and are obtained progressively by the alkaline reduction of para-nitro-ortho-toluidin, $C_6H_3(CH_3)(NH_2)(NO_2)$ [1:2:4]. The very important object we wish to attain in the first place, is the preparation of either one of these two bases, as may be required, in considerable and definite quantities, unmixed with the other, or so mixed only to a very slight degree.

We have found that by employing an aqueous solution of sodium stannite, in certain suitable proportions, as the reducing agent, para-nitro-ortho-toluidin (melting point 107° centigrade) can be readily and quantitatively converted into para-azoxy-ortho-toluidin, and the process of reduction may be stopped here, or the para-azoxy-ortho-toluidin can be further reduced to para-azo-ortho-toluidin by treatment in alcoholic solution, with a further quantity of sodium stannite. The tin used in the reduction, may be recovered, and employed for the preparation of a fresh quantity of sodium stannite. In accordance with this part of our invention, in preparing para-azoxy-ortho-toluidin, sixteen pounds of para-nitro-ortho-toluidin (melting point 107° centigrade) are suspended and partially dissolved in one hundred and fifty gallons of boiling water. A cold solution of sodium stannite, prepared by adding forty pounds of tin crystals (stannous chloride) dissolved in ten gallons of water, to forty pounds of caustic soda (ninety-eight per cent. of NaHO) dissolved in thirty gallons of water, is run into the boiling liquor. The azoxy-ortho-toluidin separates out completely from the boiling solution and is filtered off and washed. It is then dissolved in sixty gallons of boiling water and two gallons of hydrochloric acid, filtered, and the hydrochlorid precipitated from the filtrate by the addition of an excess of hydrochloric acid. From the hydrochlorid, the base is obtained by dissolving it in boiling water and precipitating with an alkali.

The para-azo-ortho-toluidin is prepared by dissolving fifteen pounds of the para-azoxy-ortho-toluidin in thirty-five gallons of methylated spirit (ninety per cent. alcohol). To the boiling alcoholic solution is added a solution of sodium stannite, prepared by adding fifteen pounds of tin crystals (stannous chlorid) dissolved in two and one-half gallons of spirit, to fifteen pounds of caustic soda (ninety-eight per cent. NaHO) dissolved in five gallons of water. The whole is kept boiling till the reaction is complete, and it is then poured into several times its bulk of water. The precipitated azo-ortho-toluidin is filtered off and washed. For further purification it can be dissolved in dilute hydrochloric acid, filtered and precipitated as hydrochlorid from the filtrate by the addition of an excess of hydrochloric acid. Either of the two bases, obtained as above described in large and definite quantities and unmixed or mixed to only a very slight degree or extent with the other base, is converted into dye stuffs in accordance with the well known methods used in the preparation of the azo colors.

Both diazo groups of the tetrazo compound may be combined with the same phenol or amine, or one may be combined with one phenol or amine, and the other with a different phenol or amine, according to methods now well known to chemists. As an instance of the application of the second part of this invention, the preparation of a bluish red color may be given. For this purpose we proceed as follows:—A solution of fourteen pounds of sodium nitrite (ninety-six per cent., in twenty gallons of water is added slowly to an iced solution of twenty-five and one-half pounds of the aforesaid azoxy-ortho-toluidin in one hundred gallons of water, containing five gallons of hydrochloric acid (thirty-three per cent HCl). The solution of the tetrazo compound, thus obtained, is then added to a solution containing fifty pounds of sodium alpha-naphthol-para-sulfonate (corresponding to Piria's naphthoic acid) and about twenty pounds of "pure alkali," (commercial anhydrous sodium carbonate) in fifty gallons of cold water. The red coloring matter which is formed is precipitated by salt, filtered and dried. The said coloring matter is a bronzy red powder very sparingly soluble in water, but readily soluble in dilute caustic soda with an orange red color. It is insoluble in alcohol. The solution in dilute soda gives a bright bluish red flocculent precipitate leaving a nearly or quite colorless fluid on subsidence or filtration. The dye stuff dissolves in concentrated sulfuric acid with a bluish red color. The caustic soda solution on addition of salt, dyes cotton without a mordant, a bright scarlet. The dyed goods stand washing remarkably well and are not affected by acids. A very similar color is obtained if in the above example the twenty-five and one-half pounds of azoxy-ortho-toluidin are replaced by twenty-four pounds of the above mentioned azo-ortho-toluidin, the rest of the substances remaining the same.

Less useful coloring matters are obtained if the sodium-alpha-naphthol-para-sulfonate be replaced by the same weight of the sodium salt of any other mono-sulfonate of alpha- or beta-naphthol. Coloring matters are also obtained by combining the tetrazo compound of azoxy-ortho-toluidin, or of azo-ortho-toluidin with phenyl, salicylic acid, phenylene diamine, tolylene diamines, diphenylamine sulfonic acids, resorcin, resorcylic acid, orcin, the sulfonic acids of alpha- or beta-naphthylamine or of their alkylated derivatives, phenyl- or tolyl-naphthylamine sulfonic acids, dioxynaphthalen sulfonic acids, &c. The tetrazo compound may be combined with two molecules of any of these bodies, or with one molecule of one and one molecule of another, in the manner well known to chemists.

We do not lay claim to the discovery of azoxy or azo-ortho-toluidin as new bodies, for, as above stated, they have already been described by Limpricht, nor do we claim the method of reducing nitro-ortho-toluidin, so as to obtain these bodies mixed together in definite proportions, nor do we cla... method of diazotization of these bod... what we believe to be novel is the ... tion of these bodies by the process scribed, separately, and in large and definite amounts, unmixed with one another.

Having now described our invention, what we claim, and desire to secure by Letters Patent, is—

1. The herein described process of preparing para-azoxy-ortho-toluidin, which consists in the treatment with a cold solution of sodium stannite of a boiling solution of para-nitro-ortho-toluidin, substantially as described.

2. The herein described process of preparing para-azo-ortho-toluidin, which consists in the treatment with a cold solution of sodium stannite of a boiling solution of para-nitro-ortho-toluidin, then dissolving the para-azoxy-ortho-toluidin so obtained in an alcoholic solution and adding thereto a solution of sodium stannite substantially as described.

3. The herein described process of preparing azo-coloring matter of various shades of yellow, orange and red having a substantive affinity for cotton, which consists in preparing para-azoxy-ortho-toluidin by the treatment with a cold solution of sodium stannite of a boiling solution of para-nitro-ortho-toluidin, then converting the said para-azoxy-ortho-toluidin into its tetrazo compound, and finally combining said tetrazo compound with any of the known phenols or amines or their sulfonic or carboxylic acids, such as the para-sulfonic acid of alpha-napthol, corresponding to Piria's naphthoic acid, substantially as described.

4. The herein described process of preparing azo-coloring matters of various shades of yellow, orange and red, having a substantive affinity for cotton, which consists in preparing para-azoxy-ortho-toluidin by the treatment with a cold solution of sodium stannite of a boiling solution of para-nitro-ortho-toluidin, then preparing para-azo-ortho-toluidin by the treatment with a solution of sodium stannite of an alcoholic solution of the said para-azoxy-ortho-toluidin, then converting the said para-azo-ortho-toluidin into its tetrazo compound and finally combining said tetrazo compound with any of the known phenols or amines or their sulfonic or carboxylic acids, such as the para-sulfonic acid of alpha-napthol, corresponding to Piria's naphthoic acid, substantially as described.

5. As a new article of manufacture, a coloring matter derived from para-azoxy-ortho-toluidin, consisting of a bronzy red powder insoluble in alcohol, (dissolving in concentrated sulfuric acid with a bluish red color) very sparingly soluble in water, but readily soluble in dilute caustic soda, which solution gives a bright bluish red precipitate, leaving [co]lorless fluid on subsidence or filtration, [dyeing] unmordanted cotton a bright scar[let, the dy]ed goods being unaffected by acids and standing the action of washing, substantially as described.

ARTHUR GEORGE GREEN.
THOMAS ATKINSON LAWSON.

Witnesses:
R. J. FRISWELL,
H. OUGHTERSON HAYMEN.